(12) United States Patent
Moon et al.

(10) Patent No.: US 8,111,770 B1
(45) Date of Patent: Feb. 7, 2012

(54) HIGH-BANDWIDTH OVER-THE-AIR SIGNAL PROCESSING

(75) Inventors: Jaekyun Moon, Plymouth, MN (US); Hui Jin, Bothell, WA (US)

(73) Assignee: Regents of the University of Minnesota, Saint Paul, MN (US)

( * ) Notice: Subject to any disclaimer, the term of this patent is extended or adjusted under 35 U.S.C. 154(b) by 755 days.

(21) Appl. No.: 11/174,423

(22) Filed: Jul. 1, 2005

Related U.S. Application Data

(60) Provisional application No. 60/584,594, filed on Jul. 1, 2004, provisional application No. 60/584,701, filed on Jul. 1, 2004, provisional application No. 60/584,589, filed on Jul. 1, 2004.

(51) Int. Cl.
*H04L 1/02* (2006.01)

(52) U.S. Cl. ...................................... 375/267

(58) Field of Classification Search .................. 375/142, 375/143, 144, 148, 150, 152, 267, 299, 316, 375/343, 346, 347, 349; 700/53; 455/101, 455/132–141, 63.1, 114.2, 278.1, 296
See application file for complete search history.

(56) References Cited

U.S. PATENT DOCUMENTS

| | | | | |
|---|---|---|---|---|
| 6,633,616 | B2* | 10/2003 | Crawford | 375/326 |
| 7,002,939 | B1* | 2/2006 | Hiramatsu | 370/335 |
| 7,009,931 | B2 | 3/2006 | Ma et al. | |
| 7,068,628 | B2 | 6/2006 | Li et al. | |
| 7,088,782 | B2 | 8/2006 | Mody et al. | |
| 7,116,725 | B2 | 10/2006 | Ketchum et al. | |
| 7,120,201 | B2 | 10/2006 | Huang et al. | |
| 7,120,405 | B2 | 10/2006 | Rofougaran | |
| 7,123,669 | B2 | 10/2006 | Ye et al. | |
| 7,123,887 | B2 | 10/2006 | Kim et al. | |
| 7,529,295 | B1* | 5/2009 | Nezami | 375/226 |
| 2002/0122381 | A1* | 9/2002 | Wu et al. | 370/208 |
| 2003/0218973 | A1 | 11/2003 | Oprea et al. | |
| 2005/0105505 | A1 | 5/2005 | Fishler et al. | |

OTHER PUBLICATIONS

Barhumi et al., "Optimal Training Sequences for Channel Estimation in MIMO OFDM Systems in Mobile Wireless Channels," *Proc. 2002 Intl. Zurich Seminar on Broadband Communications—Access-Transmission-Networking*, IEEE Zurich, Switzerland, Feb. 19-21, 2002, pp. 44-1-44-6.

Berrou et al., "Near Shannon Limit Error-Correcting Coding and Decoding: Turbo Codes," *Proc. IEEE Conf. Communications*, Geneva, Switzerland, May 1993, pp. 1064-1070.

Caire et al., "Bit-Interleaved Coded Modulation," *IEEE Trans. Inform. Theory*, 1998, 44(3):927-946.

Choi et al., "Iterative Soft Interference Cancellation for Multiple Antenna Systems," *IEEE Wireless Communications and Networking Conference*, Chicago, Illinois, Sep. 2000, pp. 304-309.

(Continued)

*Primary Examiner* — Sam K Ahn
(74) *Attorney, Agent, or Firm* — Fish & Richardson P.C.

(57) ABSTRACT

An electronic MIMO-OFDM carrier frequency recovery method is disclosed. The method includes receiving a wirelessly propagated time-domain signal observation, estimating a data-channel vector from a latest observation vector by correcting for a phase rotation effect based on an initial estimate or an up-to-date estimate of a phase rotation term, removing an effect associated with the data-channel vector from the latest observation vector using the estimated data-channel vector to obtain an up-to-date estimate of the phase rotation term; and repeating those prior acts iteratively to allow for production of FFT input samples that are free or nearly free of carrier frequency and phase error.

19 Claims, 13 Drawing Sheets

OTHER PUBLICATIONS

Duel-Hallen, "Decorrelating Decision-Feedback Multiuser Detector for Synchronous Code-Division Multiple-Access Channel," *IEEE Trans. Commun.*, 1993, 41(2):285-290.

Foschini, "Layered Space-Time Architecture for Wireless Communication in a Fading Environment When Using Multiple Antennas," *Bell Labs Technical Journal*, 1996, 1(2):41-59.

Hong et al., "A General Approach to Space-Time Trellis Codes," *Proceedings of the 40th Annual Allerton Conference on Communication, Control and Computing*, Monticello, Illinois, Oct. 2002, pp. 161-169.

IEEE Std 802.11a-1999 (Supplement to IEEE Std 802.11-1999), Part 11: wireless LAN medium access control (MAC) and physical layer (PHY) specifications: high-speed physical layer in the 5 GHZ band.

Jiang and Sidiropoulos, "A direct blind receiver for SIMO and MIMO OFDM systems subject to unknown frequency offset and multipath," *2003 4th IEEE Workshop on Signal Processing*, Rome, Italy, Jun. 2003, pp. 358-362.

Jin et al., "Carrier Phase and Frequency Recovery for MIMO-OFDM," *Globecom 2004*, Dallas, TX, Nov. 2004, pp. 2669-2673.

Li et al., "Channel Estimation for OFDM Systems with Transmitter Diversity in Mobile Wireless Channels," *IEEE J. Selected Areas Commun.*, 1999, 17(3):461-471.

Li et al., "Robust Channel Estimation for OFDM Systems with Rapid Dispersive Fading Channels," *IEEE Trans. Commun.*, 1998, 46(7):902-915.

Li, "Simplified Channel Estimation for OFDM Systems with Multiple Transmit Antennas," *IEEE Trans. Wireless Commun.*, 2002, 1(1):67-75.

Lu et al., "LDPC-Based Space-Time Coded OFDM Systems Over Correlated Fading Channels: Performance Analysis and Receiver Design," *IEEE Trans. Commun.*, 2002, 50(1):74-88.

Ma et al., "Optimal Training for MIMO Frequency-Selective Fading Channels," *IEEE Trans. Wireless Commun.*, 2005, 4(2):453-466.

Mody and Stüber, "Synchronization for MIMO OFDM Systems," *Globecom 2001*, San Antonio, Texas, Nov. 2001, pp. 509-513.

Moon and Rad, "Turbo Equalization via Constrained-Delay APP Estimation With Decision Feedback," *IEEE Trans. Commun.*, 2005, 53(12):2102-2113.

Park and Lee, "Design Criteria and Performance of Space-Frequency Bit-Interleaved Coded Modulations in Frequency-Selective Rayleigh Fading Channels," *J. Commun. Networks*, 2003, 5(2):141-149.

Pollet et al., "BER Sensitivity of OFDM Systems to Carrier Frequency Offset and Wiener Phase Noise," *IEEE Trans. Commun.*, 1995, 43(2,3,4):191-193.

ten Brink et al., "Iterative Demapping and Decoding for Multilevel Modulation," *Proc. IEEE Globecom Conf*, 1998, pp. 579-584.

Tonello, "Space-Time Bit-Interleaved Coded Modulation with an Iterative Decoding Strategy," *Proc. of IEEE Vehicular Technology Conference*, 2000, pp. 473-478.

Kim and Moon, "CCK Demodulation via Symbol Decision feedback equalizer," *IEEE Communication Letters*, Oct. 2004, 8(10):620-622.

Moon et al., "Channel estimation for MIMO-OFDM systems employing spatial multiplexing," *IEEE Vehicular Technical Conference*, Los Angeles, CA, Sep. 2004, 3649-3654.

Li and Moon, "Performance analysis of bit-interleaved space-time coding for OFDM in block fading channels," *IEEE Vehicular Technical Conference*, Milan, Italy, May 2004, pp. 684-692.

Park and Moon, "Alternative structure for computing APPs of the Markove Source," *IEEE Transactions on Information Theory*, Apr. 2003, 49(4): 1027-1029.

'Antenna DiversityStrengthens Wireless LANs' [online]. Communication Systems Design, 2003, [retrieved on Nov. 7, 2006]. Retrieved from the Internet: <URL: www.commsdesign.com/csdmag/sections/cover_story/OEG20030103S0053>, 7 pages.

'Dual Rx boosts WLAN OFDM' [online]. EE Times, 2003, [retrieved on Nov. 7, 2006]. Retrieved from the Internet: <URL:www.eetimes.com/in_focus/mixed_signals/OEG20030926S0018>, 5 pages.

Oenning and Moon, "The Effect of Jitter Noise on Binary Input Intersymbol Interference Channel Capacity," *IEEE International Conference on Communications*, 2001, vol. 8, pp. 2416-2420.

Li and Moon, "Increasing Data Rates through Iterative Coding and Antenna Diversity in OFDM-Based Wireless Communication," *Globecom 2001*, vol. 5, Nov. 2001, pp. 3130-3134.

Moon and Jeon, "Sequence detection for binary ISI channels using signal partitioning," *IEEE Transactions on Communications*, Jul. 1998, 46(7): 891-901.

Nair and Moon, "Data storage channel equalization using neural networks," *IEEE Transactions on Neural Networks*, Sep. 1997, 8(5): 1037-1048.

Zeng and Moon, "Decision feedback equalizer with pattern dependent dynamic threshold," *IEEE Transactions on Magnetics*, Jul. 1996, 32(4): 3266-3273.

Shafiee and Moon, "Knowledge-based parameter estimation for identification and equalization of storage channels," *IEEE Transactions on Magnetics*, Jul. 1996, 32(4): 3274-3282.

Moon and Carley, "Efficient sequence detection for intersymbol interference channels with run-length constraints," *IEEE Transactions on Communications*, Sep. 1994, 42(9): 2654-2660.

Wolniansky et al., "V-BLAST: An Architecture for Realizing Very High Data Rates Over the Rich-Scattering Wireless Channel," *Proc. IEEE ISSSE-98*, Pisa, Italy, Sep. 30, 1998, pp. 295-300.

* cited by examiner

HIGH-BANDWIDTH OVER-THE-AIR SIGNAL PROCESSING

CROSS REFERENCE TO RELATED APPLICATIONS

This application claims priority to U.S. Provisional Application Nos. 60/584,594, filed Jul. 1, 2004; 60/584,701, filed Jul. 1, 2004; and 60/584,589, filed Jul. 1, 2004, and are hereby incorporated by reference in their entirety.

TECHNICAL FIELD

This invention relates to systems and methods for processing of high bandwidth over-the-air data transmission and reception.

BACKGROUND

With increased reliance of all individuals, whether at work or at play, on access to various rich data sources, and with an increased demand to access such rich data sources on-the-road or on-the-run, comes a need for higher data bandwidth in portable computing and communication devices. For instance, users of mobile computing devices—from laptop computers, to cellular telephones, to wristwatches—desire access to more and more data, such as audio, streaming video, and other data-rich applications. There is thus a demand for systems and techniques that can deliver greater wireless bandwidth.

Part of the necessary process of providing high-bandwidth systems is the ability to "locate" an incoming signal and to align with the signal so that transmitted data may be extracted and read from the signal. This process becomes more complex with high bit rate communications. Also, higher bandwidth is sometimes achieved by separating a data stream into multiple simultaneous transmissions through various multiplexing processes. When such an approach is taken, the data in each transmitted signal must be identified and read, and all of the separate data must then be joined back together in the proper order.

Multiple-input and multiple-output (MIMO) communication methods attract considerable attention because of their potential to achieve much higher capacity than the traditional single-input single-output (SISO) methods. While MIMO systems based on space-time coding can be used to improve link reliability (e.g., by providing redundant information paths), MIMO systems incorporating spatial-multiplexing are used mainly to achieve high spectral efficiency. MIMO systems employing orthogonal frequency division multiplexing (OFDM) can achieve high spectral efficiency in rich scattering environments such as indoor wireless local area networks.

MIMO-OFDM systems can effectively exploit frequency diversity of frequency selective channels as well as spatial diversity of uncorrelated parallel wireless links. Bit interleaved coded modulation (BICM) used in conjunction with MIMO-OFDM and spatial multiplexing (SM) is particularly effective in exploring both spatial diversity and frequency selectivity without significant design efforts, and is well-suited for achieving very high data rates. See G. Caire et al., "Bit-interleaved coded modulation," IEEE Trans. Inform. Theory, vol. 44, no. 3, pp. 927-946, May, 1998; A. M. Tonello, "Space-time bit-interleaved coded modulation with an iterative decoding strategy," Proc. of IEEE Vehicular Technology Conference, pp. 473-478, Boston, September, 2000; B. Lu, X. Wang & K. R. Narayanan, "LDPC-based space-time coded OFDM systems over correlated fading channels: performance analysis and receiver design," IEEE Trans. on Commun., vol. 50, no. 1, pp. 74-88, January, 2002; D. Park and B. G Lee, "Design criteria and performance of space-frequency bit-interleaved coded modulations in frequency selective Rayleigh fading channels," Journal of Commun. and Networks, vol. 5, no. 2, pp. 141-149, June, 2003. In addition to exploiting spatial diversity, MIMO-OFDM systems retain the same advantages as SISO-OFDM systems, namely, reduced equalization complexity for frequency selective channels and an ability to explore frequency diversity through coding.

However, like their SISO-OFDM counterparts, MIMO-OFDM systems can be sensitive to synchronization errors, especially the carrier frequency offset (CFO). A good synchronization scheme is generally necessary to make a MIMO-OFDM system practically viable. Numerous techniques have been suggested in the literature for SISO-OFDM frequency synchronization. However, extension to MIMO systems tends to be difficult. The literature on MIMO-OFDM synchronization is relatively scarce. A training-based method has been proposed that relies on the cyclic prefix and the orthogonal polyphase sequences that can be modulated directly. See A. N. Mody & G. L. Stuber, "Synchronization for MIMO OFDM systems," in Globecom 2001, San Antonio, Tex., November, 2001. Although simple, the use of training sequences for CFO recovery significantly reduces achievable data rate. A blind technique proposed for single-input multiple-output (SIMO) antenna systems can be extended to MIMO systems. See T. Jiang & N. D. Sidiropoulos, "A direct blind receiver for SIMO and MIMO OFDM systems subject to unknown frequency offset and multipath," Submitted to SPAWC 2003, Rome, Italy, June, 2003. But this approach requires too long a delay due to iteration over a large number of OFDM symbols. Therefore, it is not a good solution for delay-sensitive applications.

Accurate channel estimation is also important in realizing the full performance potential of MIMO-OFDM systems. Channel estimation becomes a major challenge as the number of channel responses that need be characterized increases substantially, as the number of transmit and receive antennas increases. Previous works exist that identify desirable training patterns for estimating channel responses for MIMO systems. See, e.g., Y. (G.) Li, N. Seshadri, and S. Ariyavisitakul, "Channel estimation for OFDM systems with transmitter diversity in mobile wireless channels," IEEE J. Select Areas Commun., vol. 17, pp. 461-471, March, 1999; Y. (G.) Li, L. J. Cimini, and N. R. Sollegberger, "Robust channels estimation for OFDM systems with rapid dispersive fading channels," IEEE Trans. Commun., vol. 46, pp. 902-915, July, 1998; Y. (G.) Li, "Simplified channel estimation for OFDM systems with multiple transmit antennas," IEEE Trans. Wireless Commun., vol. 1, pp. 67-75, January, 2002; X. Ma et al., "Optimal training for MIMO frequency-selective fading channels," IEEE Trans. Wireless Commun., January, 2004, accepted for publication. Other works also appear in this area. See, e.g., H. V Poor "An introduction to signal detection and estimation," Spring-Verlag: New York, 1994.

There remains a need for systems and techniques that can provide extremely high wireless bandwidth in a reliable and cost-effective manner.

SUMMARY

This document describes a MIMO-OFDM carrier frequency recovery scheme based on iterative estimation of the aggregated symbol effect on the time domain observation signal and the phase rotation factor induced by carrier phase/ frequency offset. The frequency-domain data symbol effects on the received time-domain signal (including the effect of the signal fades) are compensated using a linear minimum mean squared error (LMMSE) "data-channel" extractor. Then the phase rotation term including the effect of CFO is estimated using an extended Kalman filter (EKF) approach. The estimated phase rotation term is then factored out for improved "data-channel" extraction. The process is repeated iteratively.

The proposed process can provide both phase and carrier frequency recovery and is well suited for hardware implementation. The process handles the time-domain receive signal samples sequentially as they march through the receive path, and an accurate estimation of CFO becomes available typically well before all the receive samples arrive at the FFT input. Since the FFT operation can generally take place only after all receive samples are collected anyway, there may be no extra latency associated with the proposed phase and carrier frequency recovery process. The performance of the proposed approach is validated using simulation.

The document also describes a channel estimation process for MIMO-OFDM systems with the constraint that the preamble structure complies with the IEEE 802.11a high speed WLAN standard. See Part 11: wireless LAN medium access control (MAC) and physical layer (PHY) specifications: high-speed physical layer in the 5 GHZ band, IEEE Std 802.11a-1999 (Supplement to IEEE Std 802.11-1999), incorporated herein by reference. The process helps serve the need for a modem architecture well suited for the next generation MIMO-OFDM based WLAN PHY standard that would be backward-compatible to the legacy IEEE 802.11a standard. In addition to the use of the preamble and signal field symbol defined in the 802.11a PHY standard, soft symbol decisions generated during the data portion of the packet are used in improving the channel estimates in a sequential and decision-directed mode. This approach is capable of estimating the channel responses of all sixteen parallel wireless links associated with a 4×4 SM configuration with a sufficient accuracy.

In one implementation, an electronic MIMO-OFDM carrier frequency recovery method is discussed. The method comprises receiving a wirelessly propagated time-domain signal observation, estimating a data-channel vector from a latest observation vector by correcting for a phase rotation effect based on an initial estimate or an up-to-date estimate of a phase rotation term, removing an effect associated with the data-channel vector from the latest observation vector using the estimated data-channel vector to obtain an up-to-date estimate of the phase rotation term, and repeating the prior steps iteratively to allow for production of FFT input samples that are free or nearly free of carrier frequency and phase error. The estimated phase rotation term may comprise carrier frequency offset, and may be estimated using an extended Kalman filter. The data-channel vector may be estimated using a linear minimum mean squared error estimator. Also, the wirelessly propagated time-domain signal observation may be from a signal that carries an IEEE 802.11a compliant data stream. The signal observation may also comprise a BPSK preamble. Furthermore, the method may comprise acquiring CFO, which may occur within one OFDM training signal.

In yet another implementation, an electronic signal recovery method comprises receiving a wirelessly propagated signal, estimating a channel response recursively substantially in accordance with equation (52) herein, and updating a gain in the channel estimate update process substantially in accordance with equations (56) and (57) herein. The method of claim 10, further comprising updating a gain in the channel estimate update process may be updated substantially in accordance with equation (59) herein. The channel response may be estimated recursively substantially in accordance with equation (53) herein. Moreover temporary channel estimate may be obtained substantially in accordance with any one of the equations (54), (55), (60) and (61) herein.

In some implementations, the temporary channel estimate may be obtained substantially in accordance with any one of the equations (54), (55), (60) and (61) herein. The wirelessly propagated signal may also carry an IEEE 802.11a compliant data stream. In addition, an initial channel estimate may be made using the second long preamble symbol substantially in accordance with equation (48) herein. Also, an initial channel estimate may be made using the second long preamble symbol and the signal field symbol substantially in accordance with equation (48).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
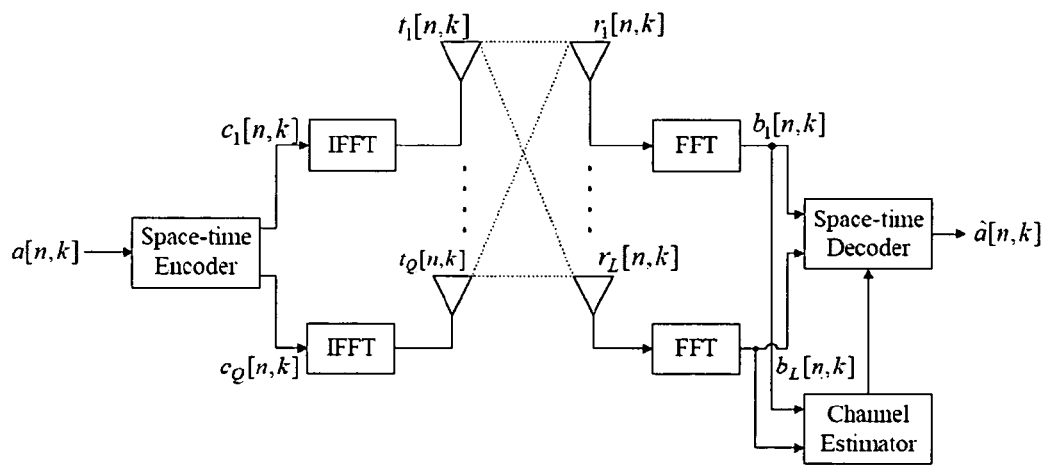
FIG. 1 is a block diagram of a MIMO-OFDM system.

I. Carrier Frequency and Phase Recovery
MIMO-OFDM System Model and Effect of CFO and Phase Behavior A MIMO-OFDM system with Q transmit and L receive antennas is shown in FIG. 1. While a space-time coded MIMO-OFDM system is shown in FIG. 1, the same structure can describe spatial multiplexing MIMO-OFDM systems if the space-time encoder and decoder blocks are replaced by the serial/parallel converter and symbol detector respectively. If there is no frequency or phase offset, the received signal at each antenna after the FFT block is $$b_l[n, k] = \sum_{q=1}^{Q} H_{ql}[n, k]c_q[n, k] + w_l[n, k] \quad (1)$$

where $c_q[n, k]$ is the kth subcarrier of the nth OFDM symbol at qth transmit antenna, $H_{ql}[n, k]$ is the corresponding channel frequency response from the qth transmit antenna to the lth receive antenna, and $w_l[n, k]$ is additive white Gaussian noise.

Equation (1) can be written in vector form as $$b[n, k] = H[n, k]c[n, k] + w[n, k], \quad (2)$$

where $b[n, k] \triangleq (b_1[n, k] \ldots b_L[n, k])^T$, $c[n, k] \triangleq (c_1[n, k] \ldots c_Q[n, k])^T$, $w[n, k] \triangleq (w_1[n, k] \ldots w_L[n, k])^T$, and (3)

$$H[n, k] \triangleq \begin{bmatrix} H_{11}[n, k] & \ldots & H_{Q1}[n, k] \\ \vdots & \ddots & \vdots \\ H_{1L}[n, k] & \ldots & H_{QL}[n, k] \end{bmatrix}.$$

If the Q-antenna space-time code is employed, then the maximum likelihood sequence estimation (MLSE) algorithm chooses $\hat{c}[n, k]$, the estimate of the transmitted signal, based on the metric $$\|b[n, k] - \hat{H}[n, k]\hat{c}[n, k]\|^2, \quad (4)$$

where $\|\cdot\|^2$ denotes the Euclidean norm and $\hat{H}[n, k]$ denotes the estimate of $H[n, k]$ from equation (2). If the space-time code is trellis-based, the minimization of equation (4) is carried out using the Viterbi algorithm. In spatial multiplexing MIMO-OFDM systems, either maximum likelihood (ML) or some sub-optimal detectors based on iterative demapping and decoding (IDD) can be used. See S. ten Brink, J. Speidel, and R. Yan, "Iterative demapping and decoding for multilevel modulation," In Proc. IEEE Globecom Conf, pp. 579-584, November 1998. The effect of CFO and phase error on SISO-OFDM systems is discussed in T. Pollet, M. Van Bladel, and M. Moeneclaey, "BER sensitivity of OFDM systems to carrier frequency offset and Wiener phase noise," In IEEE Trans. on Commun., vol. 43, no. 2/3/4, February/March/April 1995. Similar conclusions can be drawn for MIMO-OFDM systems. The results are summarized here.

In the following, $\theta[n, k]$ denotes the time varying phase error. If there is only CFO, $\theta[n, k] = 2\pi(nK+k)f_e + \theta_o$, where $f_e$ is the normalized CFO. If there is only phase noise, we can assume that $E\{\theta[n, k]\} = 0$ and $\text{Var}\{\theta[n, k]\} = \sigma_\theta^2$.

The received signal after the FFT blocks can be written as $$b[n, k] = \quad (5)$$
$$H[n, k]c[n, k] \cdot I_o + \sum_{\substack{m=0 \\ m \neq k}}^{K-1} H[n, m]c[n, m] \cdot I_{k-m} + w[n, k],$$

with $$I_k \triangleq \frac{1}{K} \sum_{m=0}^{K-1} e^{-j2\pi mk/K} e^{j2\pi \theta[n, k]}. \quad (6)$$

From equation (6), we can see that the phase error affects the performance in two ways. The first term in equation (6) shows that the received signal is attenuated by a factor of $I_0$. The second terms are contributions from the other bins, called interbin interference (IBI).

It is proved in T. Pollet et al., "BER sensitivity of OFDM systems to carrier frequency offset and Wiener phase noise," In IEEE Trans. on Commun., vol. 43, no. 2/3/4, February/March/April 1995, that while there is a CFO $f_r$ between the receiver and transmitter, i.e., $\theta[n, k] = 2\pi(nK+k)f_e + \theta_o$, the signal-to-noise ratio (SNR) degradation in dB due to the $f_e$ is $$D \approx \frac{10}{\ln 10} \frac{1}{3}(\pi f_e)^2 \frac{E_s}{N_0} \quad (7)$$

If there is only phase noise, i.e., $E\{\theta[n, k]\} = 0$ and $\text{Var}\{\theta[n, k]\} = \sigma_\theta^2$, then it is shown in equation (4) that $$D \approx \frac{10}{\ln 10} \frac{11}{60} \left(\frac{\sigma_\theta^2}{KF}\right) \frac{E_s}{N_0}. \quad (8)$$

For MIMO systems with Q transmit antennas and L receive antennas, the channel capacity at high SNR is $\min\{Q, L\}\log_2(\rho)$ plus a term that is independent of $\rho$, where $\rho$ is the average SNR at each receive antenna. Thus the capacity loss due to SNR loss D can be written as $$\Delta C \approx \min\{Q, L\} \frac{D}{10} \log_2 10. \quad (9)$$

Iterative Phase and CFO Recovery

The proposed phase and CFO recovery scheme may work on the receive signals before the FFT demodulation blocks. In one embodiment, channel state information is assumed because channel estimation is to be performed at a later stage.

The received signal at lth antenna before the FFT demodulation block is $$r_l[k] = u_l[k]y[k] + v_l[k], \quad (10)$$

where $$y[k] \triangleq e^{j\phi[k]} \quad (11)$$

is the phase rotation term that can also be viewed as the multiplicative distortion (MD) on the signal due to phase and frequency error that we want to estimate and $$u_l[k] \triangleq \frac{1}{\sqrt{K}} \sum_{q=1}^{Q} \sum_{m=0}^{K-1} c_q[m] H_{ql}[m] e^{j2\pi mk/K} \quad (12)$$

depends on the data symbols and the channel responses, which can be viewed as unwanted information as far as the phase and frequency estimation is concerned. Stacking the L received signals together, we have the vector form $$r[k] = u[k]y[k] + v[k], \quad (13)$$

where $r[k] \triangleq (r_1[k] \ldots r_L[k])^T$, $u[k] \triangleq (u_1[k] \ldots u_L[k])^T$, and $w[k] \triangleq (w_1[k] \ldots w_L[k])^T$.

Figure 2:
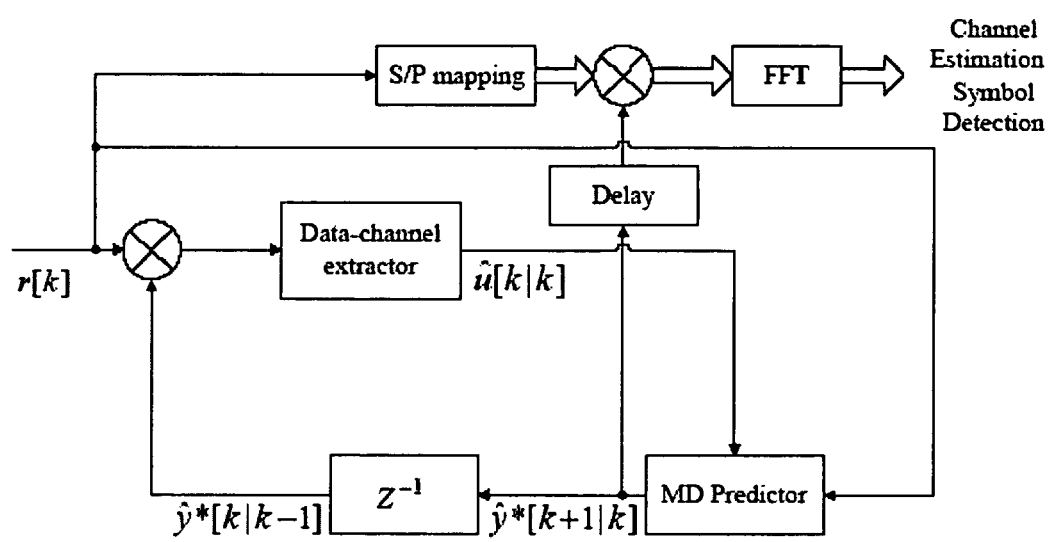
FIG. 2 is a block diagram of a phase and carrier frequency recovery scheme.

A block diagram of the proposed system is shown in FIG. 2. As seen, at time k, $\hat{y}^*[k|k-1]$, the conjugate of the estimate of $y[k]$ given $r[0] \ldots r[k-1]$ and estimates of $u[0] \ldots u[k-1]$, is used to eliminate the effect of the MD $y[k]$ from $r[k]$. The "data-channel" term $u[k]$ is then estimated, which in turn gets subtracted from $r[k]$ to provide the new prediction $\hat{y}^*[k+1|k]$ of the MD. Then we set $k=k+1$ and the procedure is repeated.

The last MD estimation $\hat{y}^*[K-1|K-2]$ will be carried over as $\hat{y}^*[0|-1]$ of the next OFDM symbol. The method can be summarized as:

1) Set $\hat{y}[0|-1]$ as $\hat{y}[K-1|K-2]$ from the last OFDM symbol.
2) Estimate $\hat{u}[k|k]$ using the data-channel extractor.
3) Update $\hat{y}[k|k-1]$ using the extend Kalman filter.
4) Repeat step 2 and 3 for $k=0 \ldots K-1$.
5) Use the final MD estimate to correct $r[k]$'s before FFT is applied.

After $r[k]$ is compensated properly by $\hat{y}[k|k-1]$, the resulting signal $\tilde{r}[k]$ is approximated by $$\tilde{r}[k] \approx Cw[k] + v'[k], \tag{14}$$

where $$c \triangleq \begin{bmatrix} \sum_{q=1}^{Q} H_{q1}[0]c_q[0] & \ldots & \sum_{q=1}^{Q} H_{q1}[K-1]c_q[K-1] \\ \vdots & \ddots & \vdots \\ \sum_{q=1}^{Q} H_{qL}[0]c_q[0] & \ldots & \sum_{q=1}^{Q} H_{qL}[K-1]c_q[K-1] \end{bmatrix}, \tag{15}$$

and $$w[k] \triangleq (1 \; \exp(-j2\pi k/K) \ldots \exp(-j2\pi k(K-1)/K))^T. \tag{16}$$

But $u[k]=Cw[k]$. Thus the data-channel extractor can estimate $C$ first; $\hat{u}[k|k]$ is then obtained from $$\hat{u}[k|k] = \hat{C}[k]w[k], \tag{17}$$

where $\hat{C}[k]$ is the estimate of $C$ at time instant $k$.

Based on equation (14), $\hat{C}[k]$ can be obtained by a linear MMSE (LMMSE) algorithm. See H. V. Poor "An introduction to signal detection and estimation," Spring-Verlag: New York, 199. Since $\hat{C}[k-1]$ is a linear function of observations $\tilde{r}[0] \ldots \tilde{r}[k-1]$ and $(\tilde{r}[k]-\hat{\tilde{r}}[k|k-1]) \perp (\tilde{r}[0] \ldots \tilde{r}[k-1])$ from the orthogonality principle, we have $$E\{\hat{C}^T[k-1](\tilde{r}[k]-\hat{\tilde{r}}[k|k-1])\}=0. \tag{18}$$

Similarly, we have $$E\{(C-\hat{C}[k-1])^T v'[k]\}=0. \tag{19}$$

From equation (19) we have $$\hat{\tilde{r}}[k|k-1] = \hat{C}[k-1]w[k] + \hat{v}'[k|k-1] \tag{20}$$
$$= \hat{C}[k-1]w[k].$$

From equation (18) we know that $\hat{C}[k-1]$ and $\tilde{r}[k]-\hat{\tilde{r}}[k|k-1]$ are uncorrelated. Thus $$\hat{C}[k] = \hat{C}[k-1] + LMMSE\{C \mid (\tilde{r}[k]-\hat{\tilde{r}}[k|k-1])\} \tag{21}$$
$$= \hat{C}[k-1] + (\tilde{r}[k]-\hat{\tilde{r}}[k|k-1])\kappa[k]^T,$$

with $$\kappa[k] = \frac{E\{C^T(\tilde{r}[k]-\hat{\tilde{r}}[k|k-1])\}}{E\{(\tilde{r}[k]-\hat{\tilde{r}}[k|k-1])^T(\tilde{r}[k]-\hat{\tilde{r}}[k|k-1])\}}. \tag{22}$$

Plugging equation (14) in equation (22), we arrive at $$\kappa[k] = \frac{M[k-1]w[k]}{w[k]^T M[k-1]w[k] + \sigma_{v'}^2}, \tag{23}$$

where the performance measure $M[k]$ is defined as $$M[k] \triangleq E\{(C-\hat{C}[k])^T(C-\hat{C}[k])\}. \tag{24}$$

From equation (18) we know that $$E\{(C-\hat{C}[k-1])^T(\tilde{r}[k]-\hat{\tilde{r}}[k|k-1])\} = \tag{25}$$
$$E\{C^T(\tilde{r}[k]-\hat{\tilde{r}}[k|k-1])\} = M[k-1]w[k].$$

By using the fact that $$k[k]E\{(\tilde{r}[k]-\hat{\tilde{r}}[k|k-1])^T(\tilde{r}[k]-\hat{\tilde{r}}[k|k-1])\},$$

$$= M[k-1]w[k] \tag{26}$$

we can update the performance measure sequentially as $$M[k] = M[k-1] - M[k-1]w[k]\kappa[k]^T - \tag{27}$$
$$\kappa[k]w[k]^T M[k-1] + M[k-1]w[k]\kappa[k]$$
$$= (I - \kappa[k]w[k])M[k-1].$$

Figure 3:
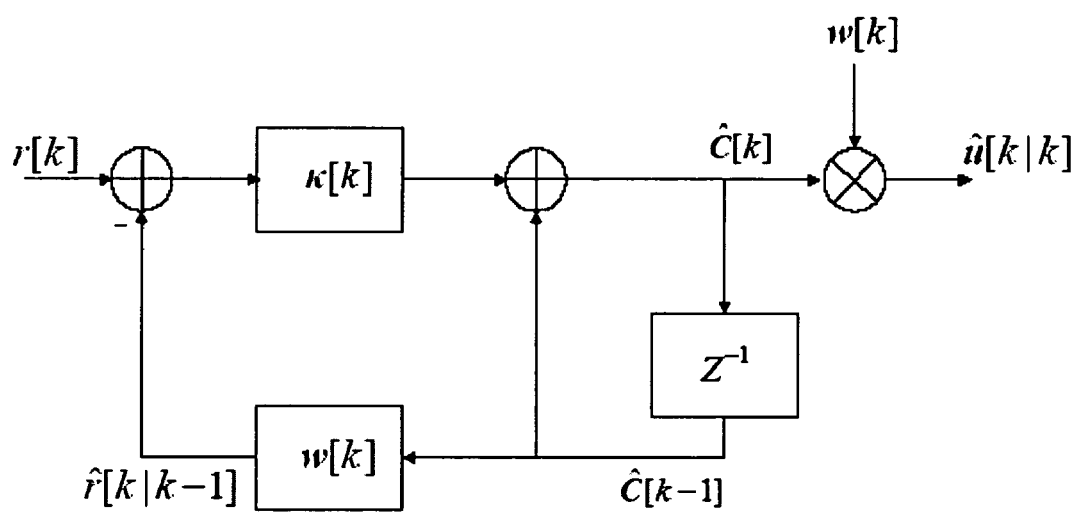
FIG. 3 is a block diagram of a data-channel extractor for unwanted information.

The algorithm for the data-channel extractor is summarized as:

$$\hat{C}[k] = \hat{C}[k-1] + (\tilde{r}[k]-\hat{\tilde{r}}[k|k-1])\kappa[k]^T \tag{28}$$
$$\hat{\tilde{r}}[k|k-1] = \hat{C}[k-1]w[k]$$
$$\kappa[k] = \frac{M[k-1]w[k]}{w[k]^T M[k-1]w[k] + \sigma_{v'}^2}$$
$$M[k] = (I - \kappa[k]w[k]^T)M[k-1],$$

where the last two equations can be calculated offline. The choice of the initial values $M[0]$ and $\sigma_{v'}^2$ determines the convergence speed and the variance of the estimate. The details of the "data-channel extractor" block in FIG. 2 are shown in FIG. 3.

Now we focus on the "MD prediction" block. Assume for the $k$th subcarrier, the frequency offset and phase offset are $\mu[k]$ and $\phi[k]$ respectively. We can further assume that the phase offset is the result of a random phase and frequency walk process $$\begin{cases} \mu[k+1] = \mu[k] + \xi^\mu[k] \\ \phi[k+1] = \phi[k] + \mu[k] + \xi^\phi[k] \end{cases}, \tag{29}$$

where inputs $\xi^\mu[k]$ and $\xi^\phi[k]$ are zero mean white Gaussian noise processes. In addition to the fixed frequency offset, this model takes care of any potential frequency drifts in the local oscillators. Equation (29) can be written in the matrix form as $$p[k+1] = Dp[k] + \xi[k], \tag{30}$$

where $$D = \begin{bmatrix} 1 & 0 \\ 1 & 1 \end{bmatrix}, \quad (31)$$

$p[k] \triangleq (\mu[k]\phi[k])^T$, and $\xi[k] \triangleq (\xi^\mu[k]\xi^\phi[k])^T$.

With the state variable p[k] the state equations (30), (11), and (13), we can apply an extended Kalman filter (EKF) to estimate phase and frequency offset. The estimate ŷ[k+1|k] of the MD is derived from the phase estimate. Specifically, we use the approximation $$e^{j\phi[k]} \approx 1 + j\phi[k] \quad (32)$$

and rewrite equation (13) as $$r[k] = u[k]\eta^T p[k] + u[k] + v[k], \quad (33)$$

where $\eta \triangleq (0\ j)^T$.

Then the standard Kalman filter can be carried out by using the measurement (33), state equation (30), and the output equation:

$$y[k] = 1 + \eta^T p[k]. \quad (34)$$

Now define $U[k] = \hat{u}[k|k]\eta^T$ and $\text{Cov}(\xi) = R$. We can estimate p[k] by using the Kalman filter:

$$K[k] = (DP[k-1]D^T + R)U^T$$

$$(U(DP[k-1]D^T + R)U^T + \sigma_v^2 I)^{-1}$$

$$\hat{p}[k] = D\hat{p}[k-1] + K[k](r[k] - \hat{u}[k|k]e^{(\eta^T \hat{p}[k-1])})$$

$$P[k] = (I - K[k]U)(DP[k-1]D^T + R), \quad (35)$$

where P[k] is the estimate of the prediction error covariance matrix. The choice of P[0] and R determines the speed of convergence and the estimation variance.

The advantages of this CFO and phase recovery scheme based on iterative data/channel extraction and MD compensation can include:
1) low complexity compared with trellis based space-time decoding or iterative decoding algorithm in the later stages of the MIMO receiver.
2) Virtually no extra delay introduced by the phase and frequency recovery process.
3) Due to its sequential nature, this process can track phase and frequency variations and reduce phase and frequency jitters.

From the simulation results, we observe that the proposed iterative tracking process converges rather fast. The performance loss compared with the synchronous case is very small. It is possible to improve the estimate performance by using a higher order Taylor expansions in equation (34), at the expense of increased latency and/or increased complexity.

Simulation Results

In this section, we apply the proposed approach to a space-time coded MIMO-OFDM system and a spatial multiplexing MIMO-OFDM system. For the 2×2 space-time trellis coded OFDM system, the space-time trellis code is used with BPSK constellation and has a bit rate of 2 bps/Hz. The generating matrix of the code is:

$$G = \begin{bmatrix} 1 & 0 \\ 1 & 1 \\ 0 & 1 \end{bmatrix}. \quad (36)$$

See Z. Hong, K. Liu, A. M. Sayeed and R. W. Heath Jr., "A general approach to space-time trellis codes," In Proceedings of the 40th Annual Allerton Conference on Communication, Control and Computing, Monticello, Ill., October 2002.

The coded bits c are generated by using $$c[k] = a[k] \cdot G, \quad (b\,37)$$

with a[k] is defined as $$a[k] \triangleq (\alpha_{2k+1}\ \alpha_{2k}\ \alpha_{2k-1})^T. \quad (38)$$

Figure 4:
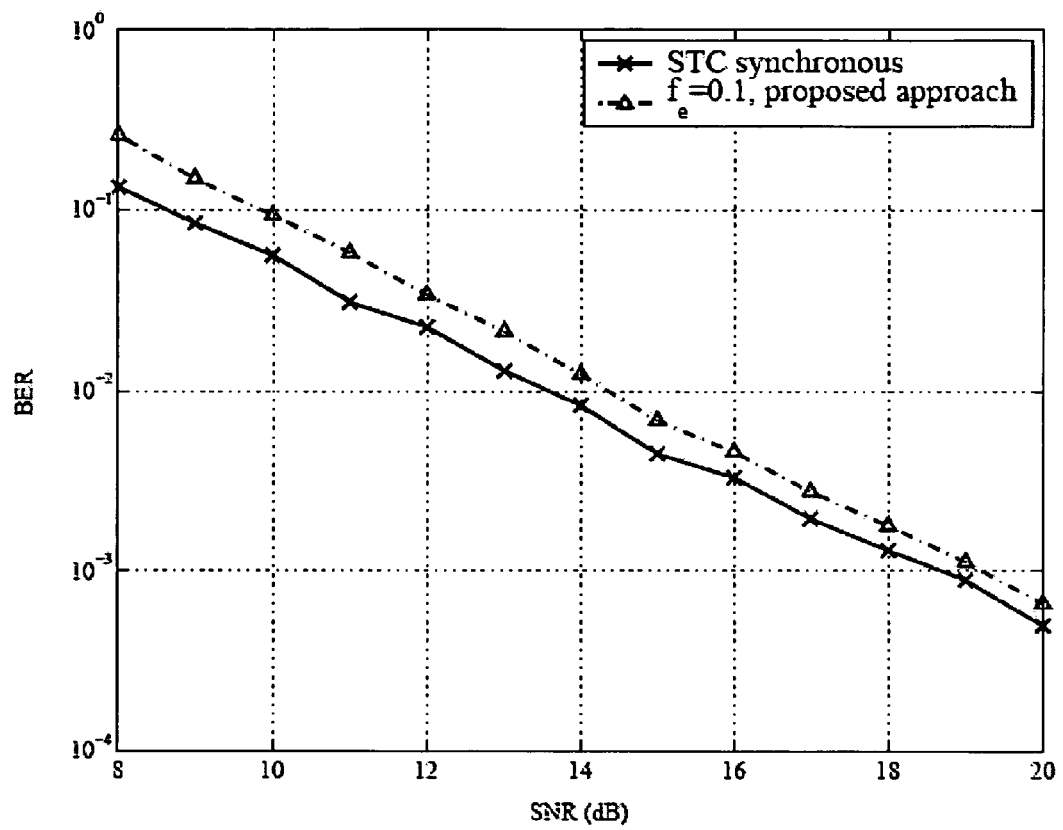
FIG. 4 shows a BER Comparison for 2×2 MIMO OFDM system with Rayleigh fading channels.

Simulation is conducted by assuming a Rayleigh fading channel. There are K=64 subcarriers per OFDM symbol. $K_u$=52 of them are modulated. There are P=4 pilot carrier per symbol. For this simulation, the channel parameters are assumed known. The BER comparison is shown in FIG. 4, where we see that the proposed approach performs very close to the synchronous case.

Simulation for the 4×4 64QAM coded spatial multiplexing OFDM system has a packet size of 512 bytes. The OFDM block format complies with the IEEE 802.11a PHY standard with K=64 subcarriers, $K_u$=48 modulated subcarriers and P=4 pilot tones. See Part 11: wireless LAN medium access control (MAC) and physical layer (PHY) specifications: high-speed physical layer in the 5 GHZ band, IEEE Std 802.11a-1999 (Supplement to IEEE Std 802.11-1999), incorporated herein by reference. The channel is modeled as $h_{i,j} = \Sigma_{n=0}^{L-1} \alpha_n e^{-j\Phi} \delta(k-n)$ where $\Phi$ is uniformly distributed in [0, 2π) and $\alpha_n$ is Rayleigh distributed with an exponential power profile $\alpha_n^{-2} = (1 - e^{-T_s/T_{rms}})e^{-nT_s/T_{rms}}$. Here $T_{rms}$=50 ns, and L=16. The channel matrix coefficients are assumed statistically uncorrelated. The convolutional code with code rate ¾ is derived by puncturing the industry-standard rate ½ code with generator polynomials $g_0$=$133_8$ and $g_1$=$171_8$.

Figure 5:
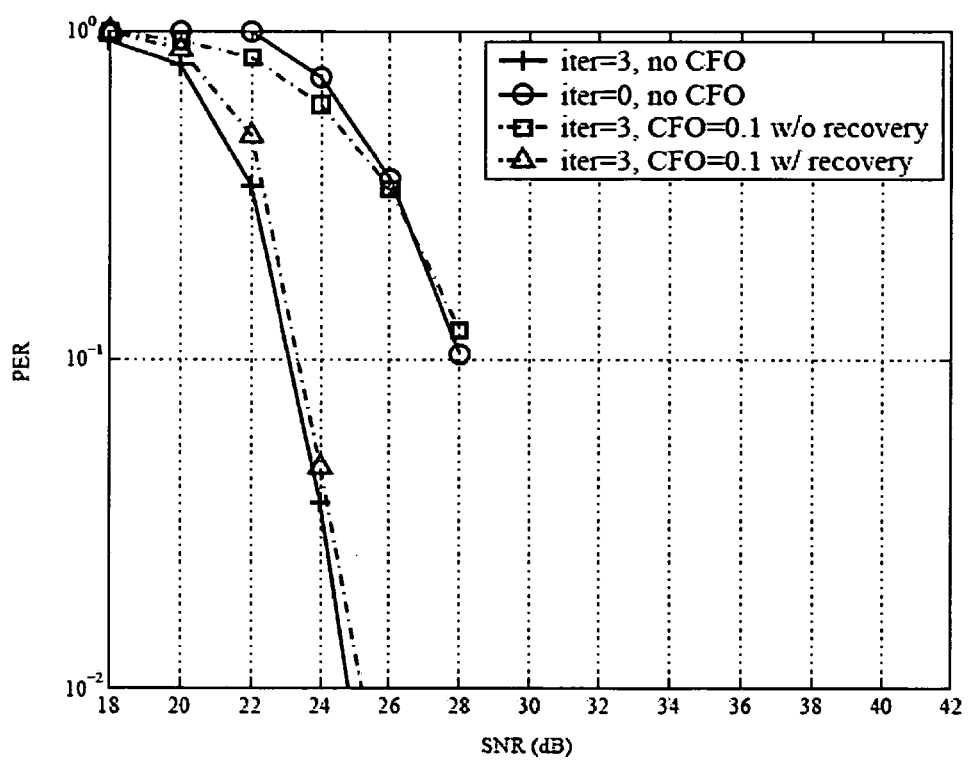
FIG. 5 shows a BER Comparison for 4×4 64QAM spatial multiplexing OFDM system with frequency.

In FIG. 5, a BER performance comparison is shown. Suboptimal soft detection based on reduced trellis and soft decision feedback is used in conjunction with IDD. See J. Moon and F. Raflee Rad, "Pragmatic Turbo equalization via constrained-delay detection with soft decision feedback for severe ISI," submitted to IEEE Trans. on Commun., 2003. and W. J. Choi, K. W. Cheong, and J. Cioffi, "Iterative soft interference cancellation for multiple antenna systems," in IEEE Wireless Communications and Networking Conference, Chicago, Ill., September 2000; S. ten Brink, J. Speidel, and R. Yan, "Iterative demapping and decoding for multilevel modulation," in Proc. IEEE Globecom Conf, pp. 579-584, November 1998. The CFO recovery is based on the BPSK preamble of one OFDM symbol, but without any channel knowledge or channel estimation. It can be seen that the proposed algorithm loses very little performance compared with the synchronous case and keeps most of the iteration gain.

Figure 6:
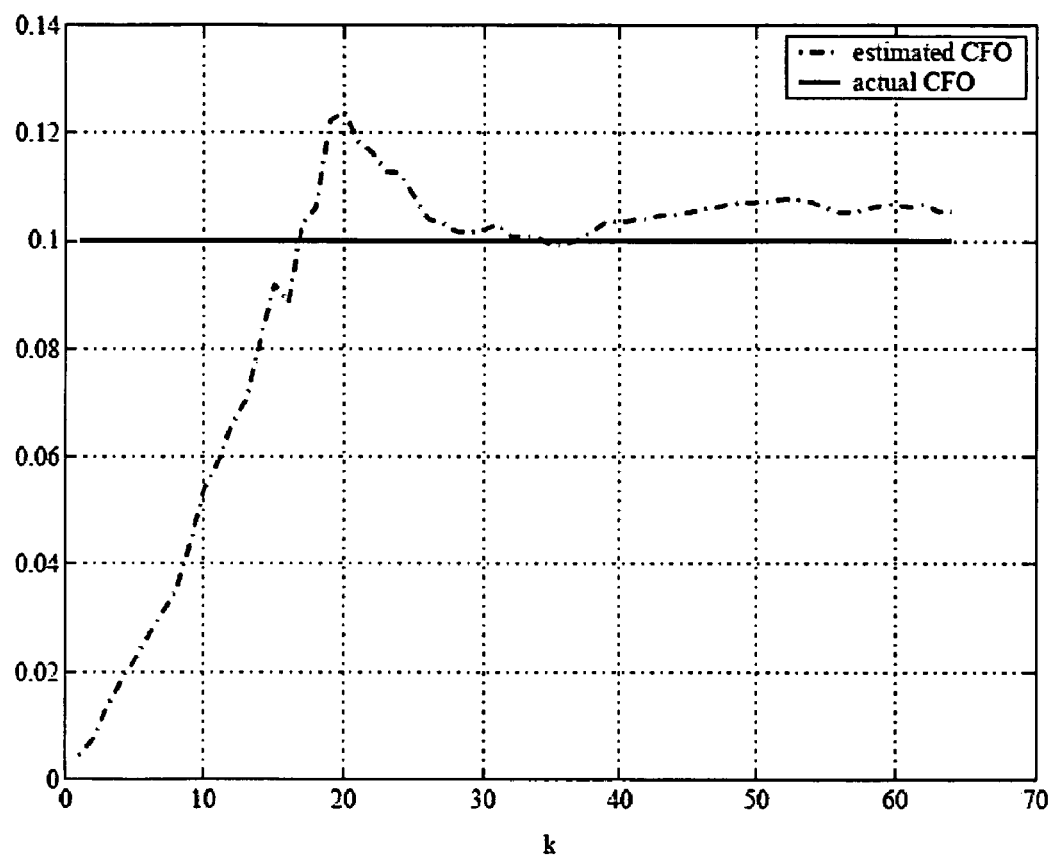
FIG. 6 shows a CFO estimate during acquisition.

The initial CFO acquisition for the proposed approach is plotted in FIG. 6. It is seen that the initial acquisition can be accomplished well within one OFDM symbol.

Figure 7:
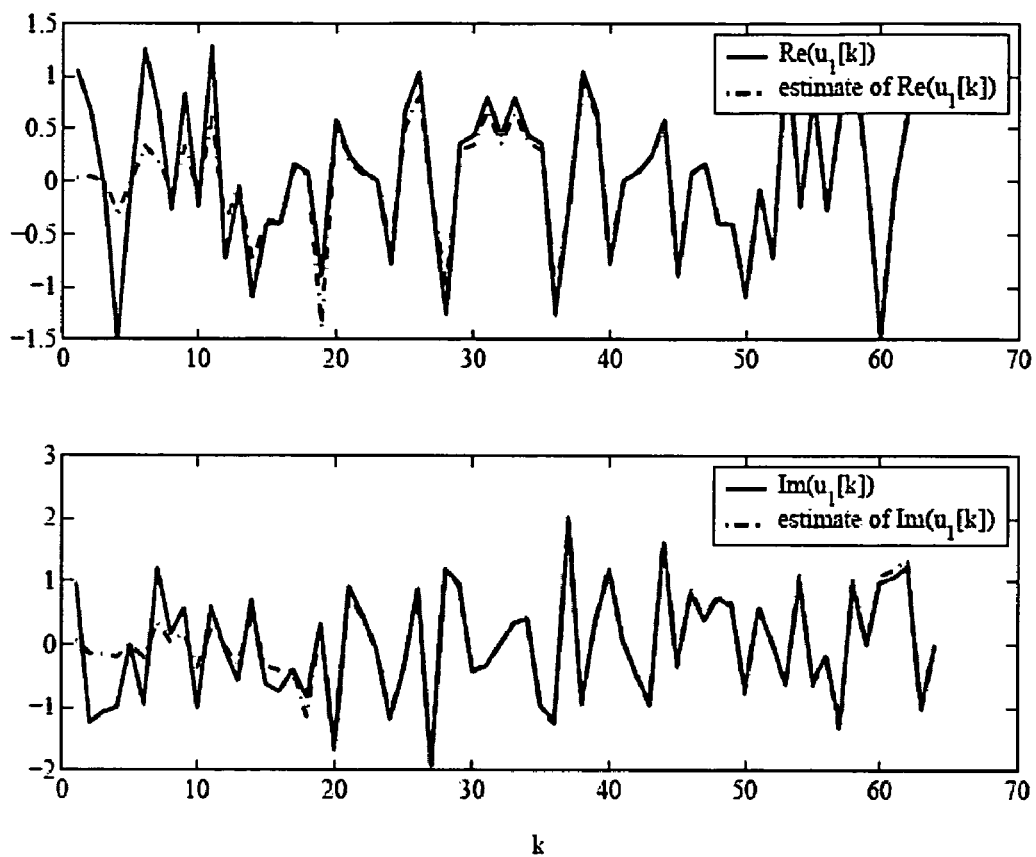
FIG. 7 shows sample outputs û[k] of a data-channel extractor compared with ideal values.

The sample output of the data-channel extractor is shown in FIG. 7, which demonstrates that û[k|k] starts to track u[k] very closely after about k>=20, well before the reception of the last sample.

Conclusion

A novel carrier phase and frequency recovery process for MIMO-OFDM systems is developed here. The proposed process has low complexity, low latency, and good tracking ability. The CFO acquisition can be done well within one OFDM training symbol. Simulation results show that the BER and PER performance obtained using the proposed process is very close to the synchronous case.

Figure 8:
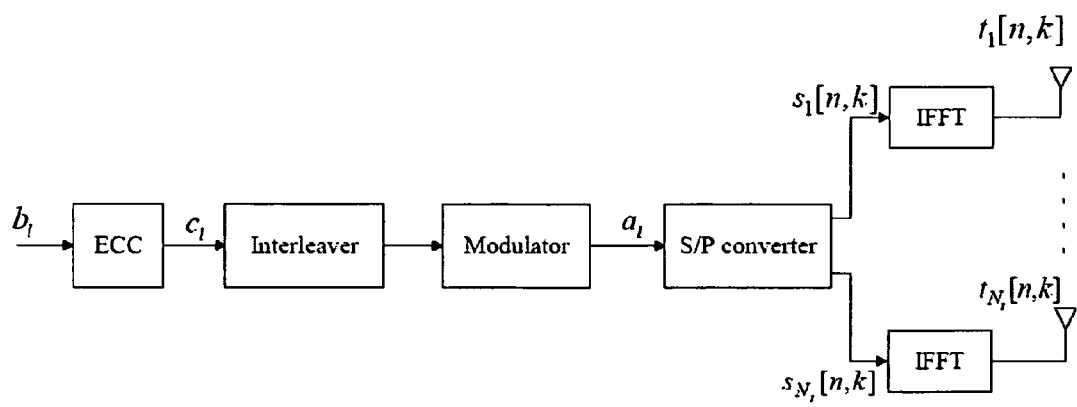
FIG. 8 is a block diagram of a baseband spatial multiplexing OFDM system.

II. CHANNEL ESTIMATION
OFDM With Spatial Multiplexing Over Wireless Channels A spatial multiplexing system with $N_t$ transmit antennas and $N_r$ receive antennas using OFDM is shown in FIG. 8. Both spatial diversity and frequency diversity are exploited using the convolutional error correction code combined with bit-level interleaving. The size of the interleaver is dictated by tradeoff between performance, which is reflected in the interleaver gain in the iterative demapping and decoding strategy employed here, and latency/complexity.

We use the iterative demapping and decoding (IDD) method described in S. ten Brink et al., "Iterative demapping and decoding for multilevel modulation," Proc. IEEE Globecom Conf, pp. 579-584, Sydney, Australia, November, 1998, a turbo-equalization-like strategy that iterates soft information between the soft-input soft-output (SISO) demapper and the SISO outer decoder.

Figure 9:
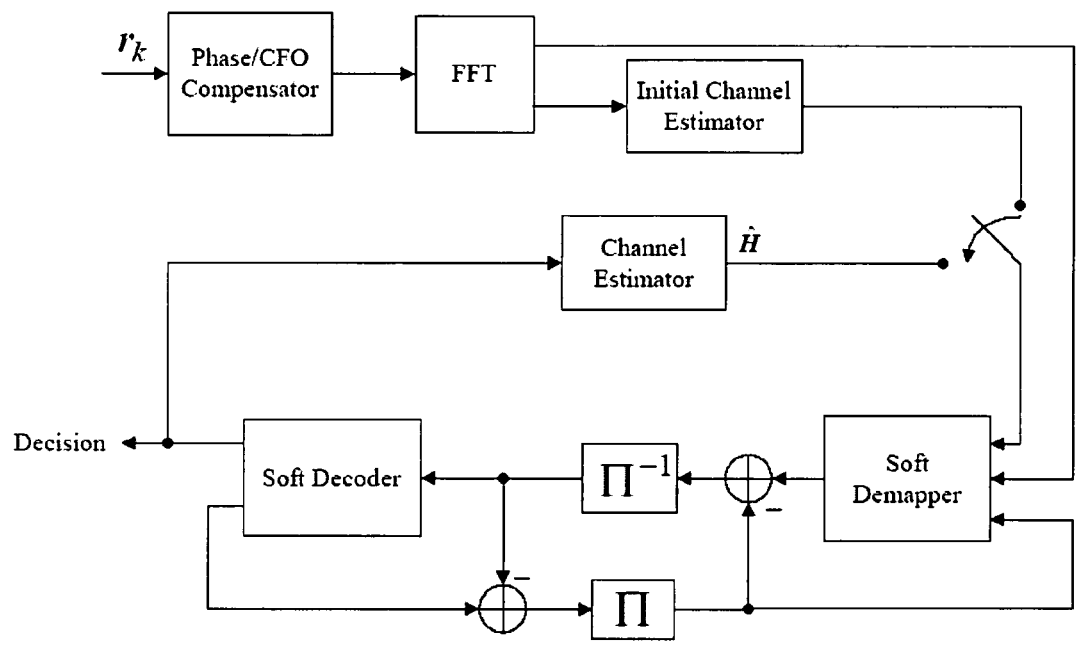
FIG. 9 is a block diagram of a receiver based on IDD and soft-decision-directed channel estimation.

As shown in FIG. 9, the difference between the a priori and the a posteriori information of the coded bits, which is called extrinsic information, is passed between the SISO demapper and the SISO decoder. The details of the channel estimator will be discussed in the next section. The carrier phase and frequency recovery scheme is discussed elsewhere in detail. See H. Jin, J. Moon, T. Jeon, and S. -K. Lee, "Carrier phase and frequency recovery for MIMO-OFDM," Globecom 2004, Dallas, Tex., November 2004, submitted for publication. The suboptimal soft-demapping scheme is briefly described in this section.

For the time being, assume that the channel response is estimated correctly and the carrier frequency and phase offset has been compensated. For a given OFDM symbol and a particular frequency bin, the received signal at the FFT output can be written as:

$$z = Hs + n, \quad (39)$$

where $z = (Z_1, Z_2, \ldots, Z_{Nr})^T$, $H = (H_{i,j})$ are the channel responses associated with all transmit and receive antenna pairs (between $j^{th}$ transmit antenna and $i^{th}$ receive antenna), $s = (s_1, s_2, \ldots, s_{Nt})^T$ are the transmitted symbols, and $n = (n_1, n_2, \ldots, n_{Nr})^T$ are additive white Gaussian noise (AWGN) samples with zero mean and variance $N_o$.

After match filtering $z$ with the channel response $H^H$, we can apply Cholesky decomposition to the symmetric matrix $H^H H$ to write $$H^H H = F^H F, \quad (40)$$

where F is an upper or lower triangular matrix. After multiplying by $(F^H)^{-1}$ the matched filter output, we arrive at $$z' = Fs + n', \quad (41)$$

where n' are still AWGN with the same mean and variance.

Since F is an upper/lower triangular matrix, detection at each antenna can be carried out based on the decision feedback principle. This is a well-established procedure first discussed in the context of multi-user detection, and is often referred to as successive interference cancellation or spatial decision feedback equalization (DFE). See A. Duel-Hallen, "Decorrelating decision-feedback multiuser detector for synchronous code-division multiple-access channel," IEEE Trans. Commun., vol. 41, no. 2, pp. 285-290, February, 1993.

In our demapping strategy, we take advantage of reliable soft symbol information that is available from the outer SISO decoder. Specifically, instead of canceling interference (i.e., the effect of symbols transmitted from the other antennas) using hard decisions from the previously decoded antennas, we treat the overall interference as a Gaussian random variable. Both the mean and variance of the overall interference can then be calculated using the a priori symbol information fed back from the SISO decoder and the estimated channel state information (CSI) from the previously processed antennas. The mean and variance so obtained are then used to compute the likelihood function necessary for the symbol detection.

This particular approach to soft decision feedback (SDF) has been employed for detecting symbols in layered MIMO architecture, and for turbo equalization of intersymbol interference channels. See J. Moon and F. Rafiee Rad, "Pragmatic turbo equalization via constrained-delay detection with soft decision feedback for severe ISI," IEEE Trans. on Commun., November, 2003, submitted for publication; W. J. Choi et al., "Iterative soft interference cancellation for multiple antenna systems," IEEE Wireless Communications and Networking Conference, Chicago, Ill., September, 2000.

To boost performance beyond what can be achieved by the full SDF method, however, we combine SDF with the reduced trellis search method of Moon & Rad, so that the resulting complexity/performance varies from that of the optimal maximum a posteriori probability (MAP) detector to that of the SDF detector, depending on the depth of the state variable used to control the size of the trellis.

To reduce the latency caused by iteration, we limit the interleaving and coding to over just one (parallel) OFDM symbol period. Simulation results show that this causes only a small performance loss compared to the ideal case where interleaving and coding are over the whole packet.

Channel Estimation

For the channel estimation purposes, we assume that the carrier frequency/phase offset has already been compensated. We first discuss initial channel estimation based on the preamble and the signal field symbol. We then show how the channel estimate can be improved in a sequential and decision directed fashion using soft symbol decisions.

1. Initial Channel Estimation Based on Training Symbol

In practical wireless systems, there typically are some preamble symbols in each transmitted packet to allow initial channel estimation (as well as estimation of other parameters such as carrier frequency offset). Here we assume an OFDM training symbol based on pseudo-random binary phase shift-keying (BPSK) symbols as the preamble. The preamble format assumed here is the same as that of the "long" preamble pattern used in the current IEEE 802.11a standard. While there are two long preamble symbols specified in the 802.11a standard (for easy channel estimation as well as fine carrier frequency offset estimation), here we use just one such symbol in validating our approach. Using one training symbol versus two apparently leads to a reduced overhead and thus an improved throughput.

However, to allow for backward compatibility of the MIMO architecture with the current 802.11a standard in the most straightforward way, the upcoming 802.11n standard might very well incorporate the same two long OFDM training symbols specified in the 802.11a standard. By retaining the same short training symbols, long training symbols and the signal field symbol in the header of each packet as in the current IEEE 802.11a standard (and assuming a specific transmission format to be discussed below), the new standard can allow legacy 802.11a single-input single-output devices to at least decode down to the signal field symbol that contains the packet length information as well as possibly information on whether the packet is transmitted using multiple transmitters. Even though it is unlikely that single-input single-output devices can decode a de-multiplexed packet from a multiple-antenna transmitter, their ability to decode at least the packet length information will allow them to smoothly participate in the carrier sensing multiple access protocol of a WLAN.

Even so, we shall still test our approach using only one long training symbol in this work. Our view here is that once the proposed channel estimation approach has been demonstrated to work well with just one training symbol, it would be clear that the use of two training symbols can only improve the performance. The second training symbol can then be used to either reduce the noise effect in the initial channel estimates obtained with just one symbol or to increase the number of initially estimated temporal channel taps for each sub-channel beyond what might be possible with one training symbol (see below for discussion on the number of channel taps that can be estimated initially). A fine carrier frequency offset compensation technique based on only one OFDM training symbol has been discussed in H. Jin et al., "Carrier phase and frequency recovery for MIMO-OFDM," Globecom 2004, Dallas, Tex., November 2004, submitted for publication.

With only a small set of training symbols, it is not possible to obtain the initial channel estimate, where $N_t$ different training symbols are needed to avoid ambiguity among subchannels. We adopt a straightforward transmission approach of using one antenna at a time (per modulation symbol) during the training symbol period, and use all $N_t$ transmit antennas in a cyclic fashion, i.e., transmitter 1, transmitter 2, . . . , transmitter $N_t$, transmitter 1, and so forth. See I. Barhumi et al., "Optimal training sequences for channel estimation in MIMO OFDM systems in mobile wireless channels," Proc. Intl. Zurich Seminar on Acess, Transmission, Networking of Broadband Communications, pp. 44-1-44-6, ETH Zurich, Switzerland, February, 2002.

Figure 10:
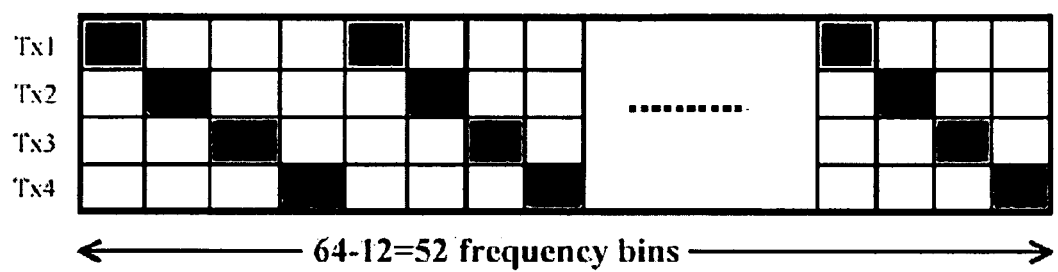
FIG. 10 shows the cyclic transmission of an OFDM training symbol over multiple antennas.

FIG. 10 illustrates cyclic transmission of the training symbol for $N_t=4$ transmit antennas and 52 subcarriers (12 of 64 subcarriers are null carriers at DC as well as at side frequencies, following the 802.11a format).

With this particular transmission format on the training symbol, the received signal at the $i^{th}$ antenna corresponding to the $j^{th}$ transmit antenna at the $n^{th}$ frequency bin and $k^{th}$ OFDM symbol is $$z_i[n, k]=H_{ji}[n, k]s_j[n, k]+n_i[n, k]. \qquad (42)$$

Applying the orthogonality principle, we get the well-known form of the linear minimum mean-squared-error (LMMSE) estimator:

$$\hat{H}_{ji}[n, k] = \frac{s_j^*[n, k]}{|s_j[n, k]|^2 + N_0/|H_{ji}[n, k]|^2} z_i[n, k] \qquad (43)$$

where the averaging of $|H_{ji}[n, k]|^2$ can be over a certain range of n, a range of k or both. Assume that the signal $z_i[n, k]$ is observed only at P particular frequency bins with position indices $\{n_1, n_2, \ldots, n_p\}$. Let L denote the length of the channel impulse response. Then $L_o(=\leq L)$ temporal channel taps can be estimated, assuming $L_o \leq P$, as $$\hat{h}=(Q^HQ)^{-1}Q^H\hat{H}_P, \qquad (44)$$

$$Q = \frac{1}{\sqrt{K}} \begin{bmatrix} 1 & e^{-j2\pi n_1/K} & \ldots & e^{-j2\pi n_1(L_0-1)/K} \\ 1 & e^{-j2\pi n_2/K} & \ldots & e^{-j2\pi n_2(L_0-1)/K} \\ \ldots & \ldots & \ldots & \ldots \\ 1 & e^{-j2\pi n_p/K} & \ldots & e^{-j2\pi n_p(L_0-1)/K} \end{bmatrix} \qquad (45)$$

An interpolation equation can then be formed by relating the complete frequency channel vector $\hat{H}=(\hat{H}_1, \hat{H}_2, \ldots, \hat{H}_K)^T$ to $\hat{h}$:

$$\hat{H}=W\hat{h}, \qquad (46)$$

where W is the K-point FFT matrix, and thereby forming a relationship between the complete H vector and the original estimated channel vector $H_p$:

$$\hat{H}=W(Q^HQ)^{-1}Q^H\hat{H}_P. \qquad (47)$$

In practical implementation, this interpolation is often approximated with only a small number of taps. Note that $W(Q^HQ)^{-1}Q^H$ can be calculated offline and its computation will not contribute to the overall complexity.

With the cyclic transmission format of FIG. 10, 52×$N_r$ channel coefficients can be estimated at the receiver side, once the whole OFDM training symbol that contains 52 modulation symbols is transmitted. On the other hand, the total number of temporal channel tap coefficients that need be estimated is L×$N_t$×$N_r$, where L is the number of temporal channel taps per sub-channel. This would mean that with one OFDM training symbol, only up to (52×$N_r$)/($N_t$×$N_r$)=52/$N_t$ (rounded to the smaller integer value) taps can be estimated per sub-channel. Thus, for $N_t$=4, this reduces to only 13 taps, less than 16 taps typically assumed as the channel length (same as the cyclic prefix length specified for the IEEE 802.11a standard). However, we observe that an initial channel estimate based only on 13 temporal taps per sub-channel provides a reliable enough starting point in our approach, wherein channel estimation continues in a decision-directed mode well into the data portion of the packet.

If the packet header format allows a second training symbol, the modulation symbols in the second OFDM training symbol can occupy frequency bins that were not been used during the transmission of the first OFDM symbol. For example, in the case of $N_t$=4, the cyclic transmission format same as that shown in FIG. 10 can be employed for the second OFDM symbol, except that the first modulation symbol now occupies, say, the third frequency bin, instead of the first one. This way, each sub-channel occupies 2×13=26 frequency bins, which will easily provide an estimate on all 16 temporal channel taps per sub-channel.

Another way to use the second training symbol is not to increase the number of temporal taps that can be estimated, but rather to reduce the effect of noise in the initial estimation of the same temporal taps. This can be achieved by transmitting the modulation symbols of the second OFDM training symbol in exactly the same frequency bins as in the transmission of the first OFDM training symbol. For example, in the case of $N_t$=4, the second symbol follows exactly the transmission format of FIG. 10.

2. Improving Initial Channel Estimation Using the Signal-Field Symbol

In the 802.11a standard, training symbols are followed by another BPSK-based OFDM symbol, called the signal field, that contains essential header information such as the data rate and packet length that need be decoded before the data portion of the packet can be processed. Since this signal field symbol is also based on BPSK and protected by a stronger base code (whose rate is ½ whereas the code rate for the data can be as high as ¾), it can be decoded with a relatively high reliability and thus can also be used in much the same way as the training symbol. Like the extra training symbol available, the signal field symbol can be used to either reduce the noise effect in the initial channel estimates and/or to increase the number of initially estimated temporal channel taps for each sub-channel. The cyclic transmission format of FIG. 10 is assumed for the signal field symbol as well.

If the additional training symbols and/or the signal field symbol are to be used to reduce the noise effect of a given set of channel taps, a sequential form of the linear minimum mean-squared error (LMMSE) algorithm is useful. The sequential form of the estimator is particularly useful if there is any time-varying component in the channel response. To avoid the cluttered notation, we drop most subscripts and indices, with an understanding that we are focused on a specific pair of transmit and receive antennas and a specific frequency bin. Then, for the kth OFDM symbol in the packet, the observation is $z[k]=s[k]H[k]+n[k]$ or $q[k]=H[k]+v[k]$, where $q[k]=z[k]/s[k]$ and $v[k]=n[k]/s[k]$. Further assuming a quasi-static channel, i.e., $H[k]=H[k-1]$, the channel estimate for the $k^{th}$ OFDM symbol can be written recursively as $$\hat{H}[k] = \hat{H}[k-1] + K[k](q[k] - \hat{H}[k-1]) \quad (48)$$

$$K[k] = \frac{M[k]}{M[k] + N_0/|s[k]|^2}$$

$$M[k] = (1 - K[k])M[k-1];$$

where $\hat{H}[0]=0$ and $M[0]$ is an initial estimate for $E(|H|^2)$.

3. Sequential and Soft-Decision-Directed Channel Update

At the decoding stage, soft symbol information improves the packet error rate (PER) performance. Simulation results indicate, as will be shown in the next section, that PER performance improves significantly through IDD iterations. Initially, only the BPSK training and signal field symbols and the pilot tones are available for channel estimation. After one iteration, soft symbol information fed back from the outer SISO decoder can be used to further improve upon the initial channel estimates. One difficulty in decision-directed channel estimation during the data portion of the received packet is that the received signal at a given antenna is composed of symbols transmitted from different antennas and is affected by a multitude of parallel sub-channels. One way of resolving this is to cancel interference based on the soft symbol information and the most recent estimated channel response. For a given receive antenna, a specific frequency bin, and a particular OFDM symbol within the packet, the observed signal is $$z = \sum_{i=1}^{N_t} H_i s_i + n. \quad (49)$$

where $s_i$ is the transmitted symbol at antenna i and $H_i$ is the sub-channel coefficient for the link between the $i^{th}$ transmit antenna and the assumed receive antenna. To estimate $H_i$, first define $$\tilde{z}_m = z - \sum_{\substack{i=1 \\ i \neq m}}^{N_t} \hat{H}_i \bar{s}_i = H_m s_m + u_m, \quad (50)$$

where $\hat{H}_i$ is the available up-to-date channel estimate (either from the initial channel estimation or estimation in the previous OFDM symbol period) and $\bar{s}_i$ is obtained from the "average" decision constructed from the available soft symbol information, i.e., $\bar{s}_i = \Sigma_{s_i} s_i P(s_i)$, with $P(s_i)$'s approximated by the a posteriori probability set available at the soft decoder output, and $u_m$ consists of both the additive noise $n_m$ and any potential error in the interference cancellation process. The overall noise variance can be written as $$\overline{|u_m|^2} = N_0 + \sum_{\substack{i=1 \\ i \neq m}}^{N_t} |\hat{H}_i|^2 \overline{|s_i - \bar{s}_i|^2}, \quad (51)$$

where the statistical average (.) is based on the a posteriori probabilities $P(s_i)$.

By using Moon and Rad, we intend to eliminate the interfering symbols and sub-channel effects and apply soft channel estimation on each sub-channel separately. There are different possible ways to utilize the soft symbol decision for channel estimation purposes. One possible approach is based on first replacing $q[k]$ in the estimate update equation of equation (48) with $\tilde{q}[k] = \tilde{z}[k]/s[k]$ to get $$\hat{H}[k] = K[k]\tilde{q}[k] + (1-K[k])\hat{H}[k-1]. \quad (52)$$

Taking an average over $s[k]$, this equation can be modified as $$\hat{H}[k] = K[k]\hat{H}_o + (1-K[k])\hat{H}[k-1], \quad (53)$$

where $$\hat{H}_o = \sum_{s[k]} \frac{\tilde{z}[k]}{s[k]} P(s[k]). \quad (54)$$

It is interesting to recognize that $$\hat{H}_o = E(H[k]/\tilde{z}[k]) \quad (55)$$

$$= \sum_{s[k]} E(H[k]/\tilde{z}[k], s[k]) P(s[k]),$$

i.e., $\hat{H}_o$, is an optimal estimator of H given $\tilde{z}[k]=H[k]s[k]+u[k]$. Note that the estimator of equation (54) is basically a weighted sum of zero-forcing estimators.

The second equation of (48), the gain update equation of the sequential LMMSE estimator, can also be modified to incorporate the soft symbol decision:

$$K[k] = \frac{M[k]}{M[k] + \sigma_w^2[k]}. \quad (56)$$

where $\sigma_w^2[k]$ is the variance of the scaled noise $u[k]/s[k]$, and can be written as (dropping the index k to reduce the notational burden), $$\sigma_w^2 = \overline{|u|^2} \sum_s \frac{P(s)}{|s|^2}. \tag{57}$$

When the quality of soft decision is high, we can make an approximation:

$$\sigma_w^2 = \overline{|u|^2} \sum_s \frac{P(s)}{|s|^2} \tag{58}$$

$$\approx \frac{\overline{|u|^2}}{\sum_s P(s)|s|^2}$$

$$= \frac{\overline{|u|^2}}{|s|^2}.$$

With this approximation, the gain update equation is modified to $$K[k] = \frac{M[k]\overline{|s[k]|^2}}{\overline{|s[k]|^2}M[k] + \overline{|u[k]|^2}}. \tag{59}$$

A variation of the estimate update equation is possible if $\hat{H}_o$ in equation (53) is replaced by $$\hat{H} = \sum_{s[k]} \frac{s^*[k]\tilde{z}[k]}{|s[k]|^2 + \overline{|u[k]|^2}/|H[k]|^2} P(s[k]), \tag{60}$$

an LMMSE estimator derived for a fixed s and then averaged over s according to P(s). Another variation results if a LMMSE estimator is derived assuming s is a random variable:

$$\hat{H} = \frac{\bar{s}[k]^*\tilde{z}[k]}{\overline{|s[k]|^2} + \overline{|u[k]|^2}/|H[k]|^2}. \tag{61}$$

Our simulation experience indicates that different combinations of the above variations on the current estimator equation and the gain update equation do not result in significant performance differences. For the results reported here, we simply choose the channel estimate update equation (53) along with the current channel estimator (54) and the gain update equation of (59). When the soft decision quality is reasonably good, $|u|^2$ in (59) can simply be replaced by $N_o$, as is done here (as will be discussed below, here we incorporated soft decisions in the channel estimation process only after the second IDD iteration, at which time soft decisions are quite reliable).

Throughout the development of the soft-decision-directed channel estimation strategies and performance simulation, we assumed that the channel matrix H is estimated and updated for every new OFDM symbol in the packet, and thus the matched filter $H^H$ is also updated for each OFDM symbol with Cholesky decomposition done anew for every new OFDM symbol. However, in practical implementation, unless the channel varies by a large scale within a given packet, it would not be necessary to update the matched filter and perform signal decomposition anew for every OFDM symbol. A practical and more reasonable strategy would be to fix the matched filter and perform the decomposition once (and thereby fix the signal decomposition filter as well), when the initial channel estimation is done at the end of the training and signal field symbols. The channel response update then can be performed on the F matrix directly.

When $N_t=N_r$, it is also possible to perform signal decomposition on the H matrix (or, in practice, the estimated H matrix) directly without matched filtering. The performance loss for bypassing matched filtering is often negligible. Detection of the signal field symbol can also generate soft decisions, which can be also be incorporated in the initial channel estimation process.

Simulation Results

Simulation is based on a fixed packet size of 512 bytes. The OFDM signal format complies with the IEEE 802.11a PHY standard with K=64 subcarriers, $K_u$ =48 modulated subcarriers, and P=4 pilot tones. The channel is modeled as $h_{i,j}[k] = \sum_{n=0}^{L-1} \alpha_n e^{-j\Phi} \delta[k-n]$ where $\Phi$ is uniformly distributed in [0, $2\pi$) and $\alpha_n$ is Rayleigh distributed with an exponential power profile $\overline{\alpha_n^2} = (1-e^{-T_s/T_{rms}})e^{-nT_s/T_{rms}}$. Here $T_{rms}$=50 ns, $T_s$=50 ns, and L=16. The channel is assumed uncorrelated across the links established over different pairs of transmit and receive antennas. As discussed, we assume one OFDM BPSK-based training symbol and one BPSK-based OFDM symbol for the signal field before the data portion of the packet starts in each packet. Initial channel estimation is based on both the training symbol and the signal field symbol.

The convolutional code with code rate ¾ is obtained by puncturing the industry-standard rate ½ code with generator polynomials $g_o$=133$_8$ and $g_1$=171$_8$. The code rate is ½ over the signal field, complying with the 802.11a standard.

As for the interleaver, either a pseudo-random interleaver or a spatial extension of the structured interleaver specified in the 802.11a standard performs well. Here we use a pseudo-random interleaver of C. Berrou et al., "Near Shannon limit error-correcting coding and decoding: turbo codes," Proc. IEEE Conf Communications, pp. 1064-1070, Geneva, Switzerland, May, 1993. Coding and bit-level interleaving are applied to the bits contained in a total of $N_t \times 64$ modulations symbols, including the null subcarriers, at a time. This is equivalent to coding and interleaving over all bits transmitted in one full OFDM period.

Figure 11:
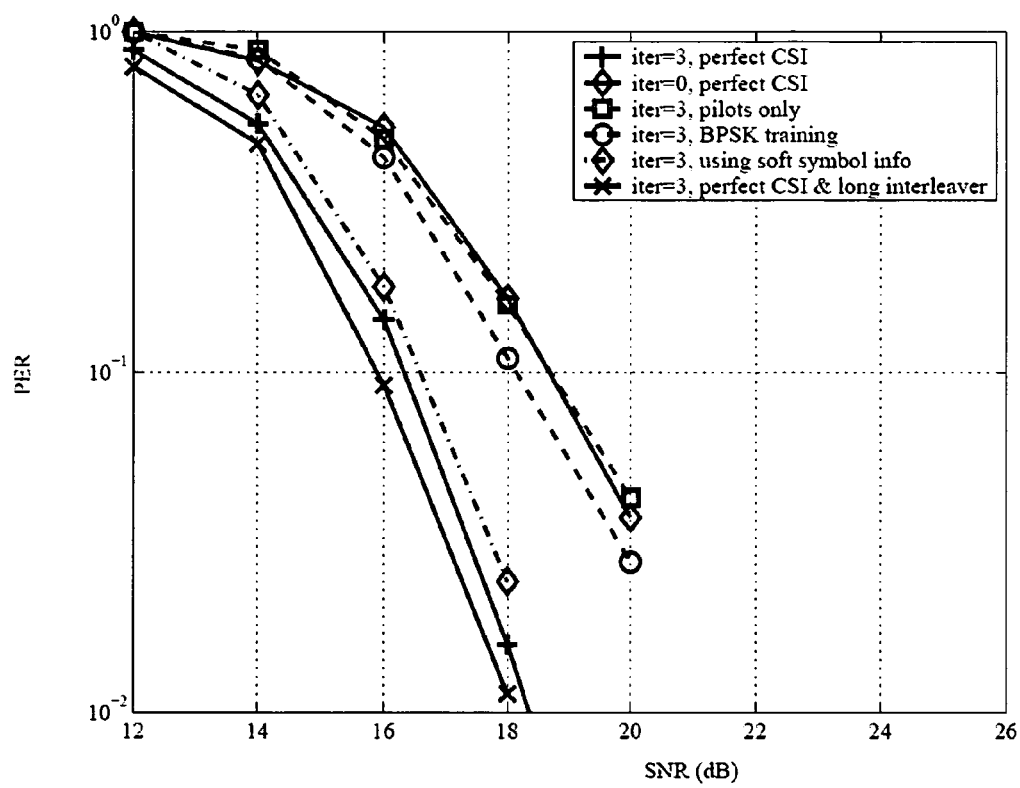
FIG. 11 shows PER performance with different channel estimators in a 2×2 16QAM SM-OFDM system using MAP detection.

In FIG. 11, we consider a 2×2 SM system (referred to as 2×2 SM-OFDM) with 16QAM constellation. This system provides a data rate of 72 Mbps. PER performances with different channel estimation strategies are shown. The SNR is defined as the total transmitter power (over all transmit antennas) to noise ratio. Optimal MAP detection is used in this case since the required complexity for 2×2 is manageable. Up to 3 IDD iterations are performed in each case. With channel estimation based on pilots only, the PER performance is about 3 dB away, at 1 percent PER, from the case of perfect CSI.

For simulation of channel estimation based on pilots only, the following pilot transmission format is used. Assume that P can be divided by $N_t$ so that $P=N_pN_t$ for some natural number $N_p$. Then the $i^{th}$ transmit antenna only transmits pilot tones at frequency bins (i−1)K/P, (i−1+$N_t$)K/P, . . . , (i−1+($N_p$−1)$N_t$)K/P. This guarantees that in a given frequency bin, only one pilot tone can be transmitted. In this way, each sub-channel can be estimated separately using (48) and (47) (it is also proved in ma et al. that assigning pilots in this way is optimal in the capacity sense).

By using one BPSK OFDM training symbol for channel estimation, the performance is improved somewhat, but not by much. Once the soft information is incorporated in the channel estimation, the PER performance is improved significantly. In our simulation, soft symbol information is incorporated into channel estimation only after the second iteration, when the reliability of soft information is high.

Also, we see that coding and interleaving over just one OFDM symbol period do not result in much performance degradation compared with coding and interleaving over the whole packet, which is shown as the curve labeled by "perfect CSI & long interleaver."

Figure 12:
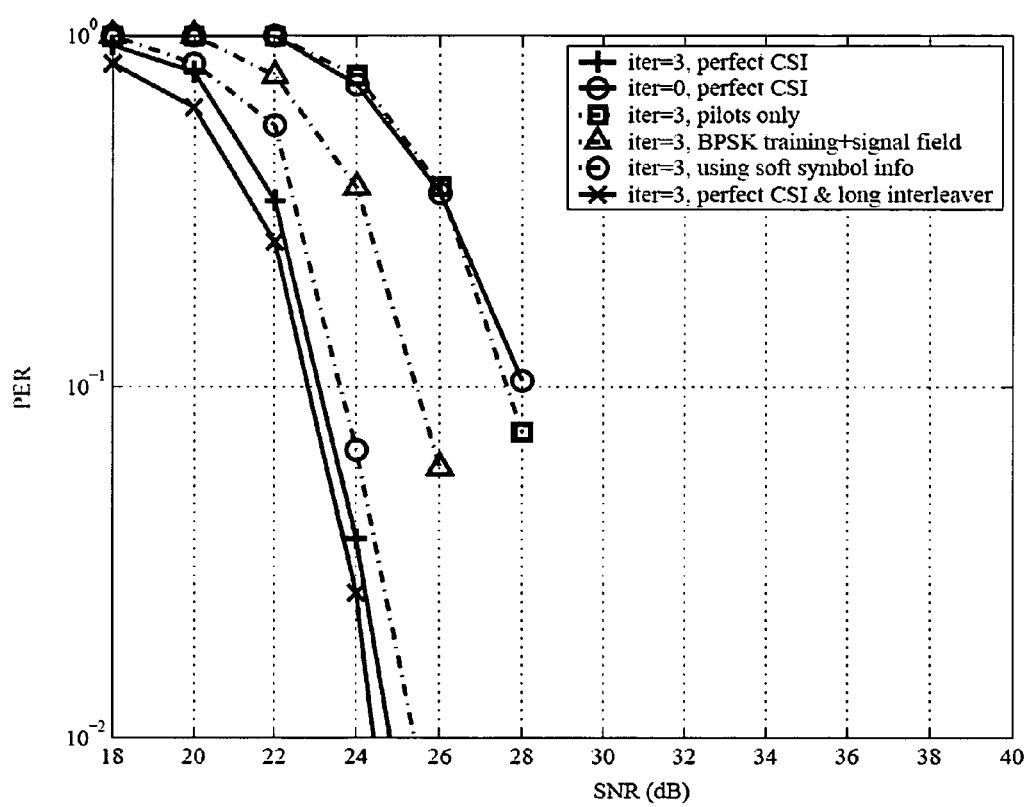
FIG. 12 shows PER performance with different channel estimators in a 4×4 64QAM SM-OFDM system using a reduced-trellis MAP/SDF detector.

In FIG. 12, we apply a suboptimal reduced-trellis SDF demapper of depth 1 to a 4×4 SM-OFDM with 64QAM constellation. This configuration delivers a data rate of 216 Mbps. Again we see that with channel estimation based on pilots only, the PER performance is far from the ideal case. By using one BPSK training symbol and the BPSK signal field, the improvement is significant. When soft symbol information is used in addition, the performance approaches the ideal CSI case within a fraction of a dB. Again, coding and interleaving over just one OFDM symbol period does not cause significant performance loss compared with coding and interleaving over the entire packet.

Figure 13:
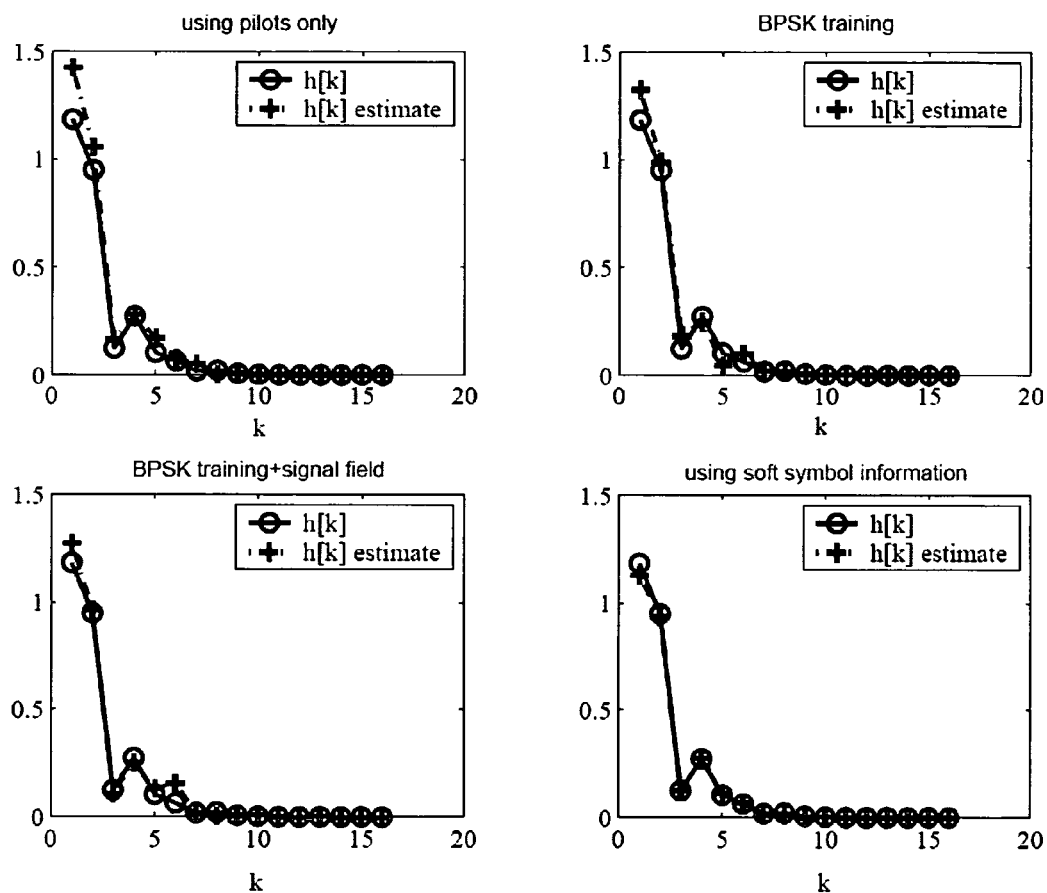
FIG. 13 shows estimated temporal channel taps versus actual taps for a 4×4 64QAM SM-OFDM system using a reduced-trellis MAP/SDF detector.

One sample realization of the channel estimation process is shown in FIG. 13. It is seen that the use of soft symbol information improves the quality of the channel estimate visibly.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The systems and techniques may be implemented in hardware, firmware, or software as part of the logical physical (PHY) layer under the ISO/OSI network model. The system may be included on a single chip with other components, such as a media access controller (MAC), and may be included with other PHY and MAC instantiations on a single chip for multiple port applications, such as on a switch or router. The techniques may allow for receipt and interpretation of multiple types of data, such as actual transmitted data packets, and also data such as auto negotiation and other link set-up and maintenance information. In a multi-speed or multi-protocol application, the system may be bypassed or otherwise avoided for lower-bandwidth transmission, such as if an auto negotiation process determines that incoming signals are part of a lower bandwidth (e.g., 802.11a, 802.11b, or 802.11g) signal.

A number of embodiments of the invention have been described. Nevertheless, it will be understood that various modifications may be made without departing from the spirit and scope of the invention. Accordingly, other embodiments are within the scope of the following claims.

What is claimed is:

1. An electronic multiple-input multiple-output (MIMO) orthogonal frequency-division multiplexing (OFDM) carrier frequency recovery method, comprising:
   (a) receiving a wirelessly propagated time-domain signal observation;
   (b) electronically estimating with a computer processor a data-channel vector from a latest observation vector that is taken before a fast Fourier transform (FFT) by correcting for a phase rotation effect based on an initial estimate or an up-to-date estimate of a phase rotation term;
   (c) removing an effect associated with the data-channel vector from the latest observation vector using the estimated data-channel vector to obtain an up-to-date estimate of the phase rotation term; and
   (d) repeating step (a) through (c) iteratively on time-domain signal observations to allow for production of FFT input samples that are free or nearly free of carrier frequency and phase error.

2. The method of claim 1, wherein the estimated phase rotation term comprises carrier frequency offset.

3. The method of claim 1, wherein the phase rotation term is estimated using an extended Kalman filter.

4. The method of claim 1, wherein the data-channel vector is estimated using a linear minimum mean squared error estimator.

5. The method of claim 4, wherein the wirelessly propagated time-domain signal observation relates to a signal that carries an IEEE 802.11a compliant data stream.

6. The method of claim 1, wherein the wirelessly propagated time-domain signal observation relates to a signal that carries an IEEE 802.11a compliant data stream.

7. The method of claim 1, wherein the wirelessly propagated time-domain signal observation comprises a binary phase-shift keying (BPSK) preamble.

8. The method of claim 1, further comprising acquiring carrier frequency offset (CFO).

9. The method of claim 8, wherein the CFO is acquired within one OFDM training signal.

10. An electronic signal recovery method comprising:
   (a) receiving a wirelessly propagated signal;
   (b) electronically estimating with a computer processor a channel response recursively substantially in accordance with equation $$\hat{H}[k]=K[k]\tilde{q}[k]+(1-K[k])\hat{H}[k-1];$$

and
   (c) automatically updating a gain in the channel estimate update process substantially in accordance with equations $$K[k] = \frac{M[k]}{M[k] + \sigma_w^2[k]}, \text{ and}$$

$$\sigma_w^2 = \overline{|u|^2} \sum_s \frac{P(s)}{|s|^2},$$

wherein k is the kth subcarrier of the signal, M[k] is a performance measure of the kth symbol, $\hat{H}[k]$ is the linear minimum mean-squared error estimator for the kth symbol, s is a transmitted symbol, P is a particular frequency bin, $\sigma_w^2$ and is variance of scaled noise in the signal, $\overline{q}[k]=\overline{z}[k]/s[k]$, s[k] is a transmitted symbol, $\overline{z}[k]$ is $\overline{z}|_m$, u is $u_m[k]$ where m points to a particular receiver and index k to a particular OFDM signal.

11. The method of claim 10, further comprising updating a gain in the channel estimate update process substantially in accordance with equation $$K[k] = \frac{M[k]\overline{|s[k]|^2}}{|s[k]|^2 M[k] + \overline{|u[k]|^2}},$$

wherein s[k] is a transmitted symbol for the kth subcarrier and u[k] is a noise factor for the kth subcarrier.

12. The method of claim 10, further comprising estimating the channel response recursively substantially in accordance with equation $$\hat{H}[k]=K[k]\hat{H}_o+(1-K[k])\hat{H}[k-1],$$

wherein $\hat{H}_o$ is an optimal estimator of H.

13. The method of claim 12, further comprising obtaining the temporary channel estimate substantially in accordance with any one of the equations $$\hat{H}_o = \sum_{s[k]} \frac{\tilde{z}[k]}{s[k]} P(s[k]).$$

$$\hat{H}_o = E(H[k]/\tilde{z}[k]),$$

$$= \sum_{s[k]} E(H[k]/\tilde{z}[k], s[k])P(s[k]),$$

$$\hat{H} = \sum_{s[k]} \frac{s^*[k]\tilde{z}[k]}{|s[k]|^2 + \overline{|u[k]|^2}/|H[k]|^2} P(s[k]),$$

$$\hat{H} = \frac{\overline{s}[k]^*\tilde{z}[k]}{|s[k]|^2 + \overline{|u[k]|^2}/|H[k]|^2},$$

wherein z[k] is an observation for a kth OFDM symbol in a packet.

14. The method of claim 11, further comprising estimating the channel response recursively substantially in accordance with equation $$\hat{H}[k]=K[k]\hat{H}_o+(1-K[k])\hat{H}[k-1].$$

15. The method of claim 14, further comprising obtaining the temporary channel estimate substantially in accordance with any one of the equations $$\hat{H}_o = \sum_{s[k]} \frac{\tilde{z}[k]}{s[k]} P(s[k]).$$

$$\hat{H}_o = E(H[k]/\tilde{z}[k]),$$

$$= \sum_{s[k]} E(H[k]/\tilde{z}[k], s[k])P(s[k]),$$

$$\hat{H} = \sum_{s[k]} \frac{s^*[k]\tilde{z}[k]}{|s[k]|^2 + \overline{|u[k]|^2}/|H[k]|^2} P(s[k]), \text{ and}$$

$$\hat{H} = \frac{\overline{s}[k]^*\tilde{z}[k]}{|s[k]|^2 + \overline{|u[k]|^2}/|H[k]|^2},$$

wherein z[k] is an observation for a kth OFDM symbol in a packet.

16. The method of claim 10, wherein the wirelessly propagated signal carries an IEEE 802.11a compliant data stream.

17. The method of claim 10, further comprising making an initial channel estimate using the second long preamble symbol substantially in accordance with equation $$\hat{H}[k]=\hat{H}[k-1]+K[k](q[k]-\hat{H}[k-1])$$

$$K[k] = \frac{M[k]}{M[k] + N_0/|s[k]|^2}$$

$$M[k]=(1-K[k])M[k-1],$$

wherein q[k] is an observation for a Kth OFDM symbol in a packet.

18. The method of claim 10, further comprising making an initial channel estimate using the second long preamble symbol and the signal field symbol substantially in accordance with equation $$\hat{H}[k]=\hat{H}[k-1]+K[k](q[k]-\hat{H}[k-1])$$

$$K[k] = \frac{M[k]}{M[k] + N_0/|s[k]|^2}$$

$$M[k]=(1-K[k])M[k-1],$$

wherein q[k] is an observation for a Kth OFDM symbol in a packet.

19. The method of claim 1, further comprising performing an FFT from a signal that results from steps (a)-(c).

* * * * *